US012512598B2

(12) United States Patent
Lv et al.

(10) Patent No.: US 12,512,598 B2
(45) Date of Patent: Dec. 30, 2025

(54) CAVITY FILTER, MULTIPLEXER, RADIO FREQUENCY (RF) DEVICE AND BASE STATION ANTENNA

(71) Applicant: CommScope Italy, S.r.l., Agrate Brianza (IT)

(72) Inventors: Yangzhun Lv, Suzhou (CN); Qing Mi, Suzhou (CN); Xianxiang Li, Suzhou (CN); Quan Cao, Suzhou (CN)

(73) Assignee: CommScope Italy S.r.l., Agrate Brianza (IT)

( * ) Notice: Subject to any disclaimer, the term of this patent is extended or adjusted under 35 U.S.C. 154(b) by 321 days.

(21) Appl. No.: 18/121,199

(22) Filed: Mar. 14, 2023

(65) Prior Publication Data

US 2023/0299492 A1 Sep. 21, 2023

(30) Foreign Application Priority Data

Mar. 17, 2022 (CN) ......................... 202210263232.0

(51) Int. Cl.
*H01Q 13/18* (2006.01)
*H01Q 15/22* (2006.01)

(52) U.S. Cl.
CPC ............. *H01Q 13/18* (2013.01); *H01Q 15/22* (2013.01)

(58) Field of Classification Search
CPC ........ H01Q 13/18; H01Q 15/22; H01Q 1/246; H01P 1/2053; H01P 1/208; H01P 7/06; H01P 1/2002; H01P 1/2084; H01P 1/20; H01P 1/207; H01P 1/205; H01P 7/04; H01P 7/10; H01P 1/212; H01P 1/2082; H01P 11/007; H01P 5/02; H01P 5/12; H01P 7/00; H01P 1/202; H01P 5/024; H01P 7/105; H01P 1/201; H01P 1/203; H01P 1/20327; H01P 1/20336; H01P 1/2086; H01P 1/2088; H01P 11/00; H01P 1/02; H01P 1/062; H01P 1/127; H01P 1/213; H01P 1/2136; H01P 11/001; H01P 11/002; H01P 3/06; H01P 5/085; H01P 5/16; H01P 7/065; H03H 9/02228; H03H 9/13; H03H 9/542; H03H 9/568; H03H 2003/023; H03H 3/02; H03H 9/02031; H03H 9/02157; H03H 9/17; H03H 9/174; H03H 9/205; H03H 9/545; H03H 9/564; H03H 7/0115; H03H 1/00; H03H 2001/0085; H03H 7/0153; H03H 7/06; H03H 9/02015; H03H 9/02023;
(Continued)

(56) References Cited

U.S. PATENT DOCUMENTS

| | | | | |
|---|---|---|---|---|
| 7,834,721 B2 * | 11/2010 | Juri | H01P 1/2082 | 333/202 |
| 2013/0009728 A1 * | 1/2013 | Puoskari | H01P 1/2053 | 333/203 |

(Continued)

*Primary Examiner* — John W Poos
(74) *Attorney, Agent, or Firm* — Myers Bigel, P.A.

(57) ABSTRACT

A cavity filter comprises a housing which defines an internal cavity, first and second resonators in the internal cavity, and a metal coupling sheet. The first resonator has first and second spaced apart coupling panels, and the second resonator has third and fourth spaced apart coupling panels. The metal coupling sheet has a first coupling section positioned between the first coupling panel and the second coupling panel and a second coupling section positioned between the third coupling panel and the fourth coupling panel.

20 Claims, 13 Drawing Sheets

(58) Field of Classification Search
CPC .... H03H 9/02055; H03H 9/173; H03H 9/175; H03H 9/30
See application file for complete search history.

(56) References Cited

U.S. PATENT DOCUMENTS

| | | | | |
|---|---|---|---|---|
| 2018/0277918 | A1* | 9/2018 | Kim | H01P 5/024 |
| 2020/0295423 | A1* | 9/2020 | Li | H01P 7/04 |

* cited by examiner

CAVITY FILTER, MULTIPLEXER, RADIO FREQUENCY (RF) DEVICE AND BASE STATION ANTENNA

CROSS-REFERENCE TO RELATED APPLICATION

The present application claims priority to Chinese Patent Application No. 202210263232.0, filed Mar. 17, 2022, the entire content of which is incorporated herein by reference as if set forth fully herein.

FIELD

The present disclosure relates to communication systems, and more particularly to a cavity filter, a multiplexer, a radio frequency (RF) device and a base station antenna that are suitable for use in radio communication systems.

BACKGROUND

Referring to FIG. 1, multi-band base stations may comprise an antenna 640 that is configured to transmit and receive radio communication signals within multiple RF bands, radio equipment 610 for a first frequency band, radio equipment 620 for a second frequency band, and a multiplexer 630. Multiplexer 630 is connected to the antenna 640 by a connection path 650 (e.g., a coaxial cable). In some cases, the connection path 650 may be connected to a diplexer (not shown) so that the transmitting and receiving of signals can be carried on a single connection path 650. It will be appreciated that the base station may typically comprise various other equipment (not shown) such as, for example, a power supply, backup batteries, a power bus, an Antenna Interface Signal Group ("AISG") controller and the like.

In a multi-band base station, the multiplexer 630 acts as a combiner to combine signals within the first and second frequency bands into a combined signal when transmitting signals and as a splitter to separate signals within the first and second frequency bands from one another when receiving signals. In a known implementation, the multiplexer 630 may comprise two band-pass filters, and the two band-pass filters allow the passing through of signals within their respective passbands and they largely block signals within the other frequency bands.

Thus, each band-pass filter is used to pass radio frequency signals in a certain frequency range, and filter out RF signals and/or noise signals in other frequency ranges. Various filters are currently being used in cellular communication base stations, including: microstrip filters, interdigital filters, cavity filters (e.g., coaxial cavity filters), waveguide filters, comb-line filters, helical filters, small lumped parameter filters, ceramic dielectric filters, SIR filters, etc. Cavity filters are widely used in cellular communication base stations, particularly in applications requiring high levels of frequency selectivity.

In the cavity filter, the frequency characteristics of the filter may be adjusted by tuning the resonant frequency of each resonator and the coupling (e.g., electrical coupling and/or magnetic coupling) between different pairs of resonators. However, the frequency characteristics of the filter are easily affected by various interference factors and may cause undesirable changes. These interference factors may be diverse, for example, manufacturing tolerances, assembly errors and/or temperature changes, etc. Designing a cavity filter with high robustness and good stability is an urgent technical problem to be solved by those skilled in the art.

SUMMARY

One of the aims of the present disclosure is to provide a cavity filter, a multiplexer, an RF device, and a base station antenna that are suitable for use in communication systems.

According to a first aspect of the present disclosure, a cavity filter is provided, comprising a housing, which defines an internal cavity; a first resonator disposed in the internal cavity, where the first resonator has a first coupling panel and a second coupling panel spaced apart from the first coupling panel; a second resonator disposed in the internal cavity, where the second resonator has a third coupling panel and a fourth coupling panel spaced apart from the third coupling panel; a metal coupling sheet, which has a first coupling section positioned between the first coupling panel and the second coupling panel and a second coupling section positioned between the third coupling panel and the fourth coupling panel.

According to a second aspect of the present disclosure, a cavity filter is provided, comprising: a housing, which defines an internal cavity; a first resonator disposed in the internal cavity; a second resonator disposed in the internal cavity; a metal coupling sheet, which comprises a first coupling section for coupling with the first resonator and a second coupling section for coupling with the second resonator, in which, the first coupling section and the first resonator form a first capacitance and a second capacitance, and the second coupling section and the second resonator form a third capacitance and a fourth capacitance.

Figure 1:
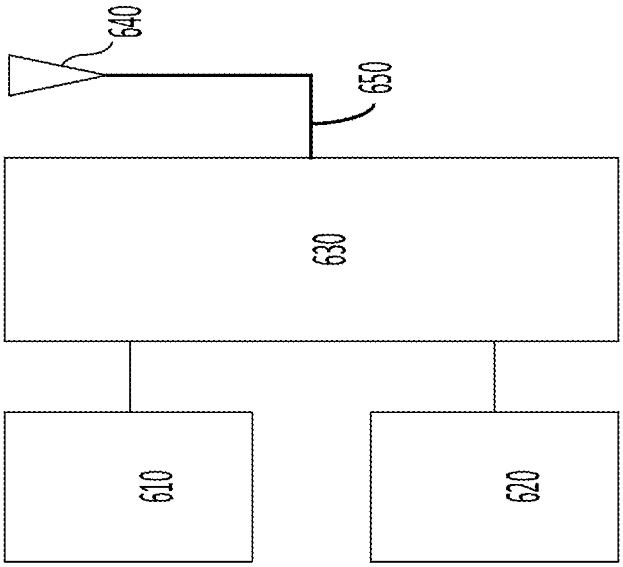
FIG. 1 is a simplified schematic diagram of a conventional multi-band base station in a radio communication system.

Note that in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like sometimes may not indicate the actual position, dimension, and range. Therefore, the present disclosure is not limited to the positions, dimensions, and ranges disclosed in the attached drawings and the like.

DETAILED DESCRIPTION

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this specification, elements, nodes or features that are "coupled" together may be mentioned. Unless explicitly stated otherwise, "coupled" means that one element/node/feature can be mechanically, electrically, logically or otherwise connected with another element/node/feature in a direct or indirect manner to allow interaction, even though the two features may not be directly connected. That is, "coupled" is intended to comprise direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

A first aspect of the present disclosure provides a cavity filter, which may be used as a stand-alone device or which may be used to form a duplexer, a diplexer, a combiner/splitter, and/or a multiplexer/demultiplexer, etc. Another aspect of the present disclosure also provides an RF device, which comprises a cavity filter according to some embodiments of the present disclosure. Some embodiments of the present disclosure are described based on the RF device.

Figure 2:
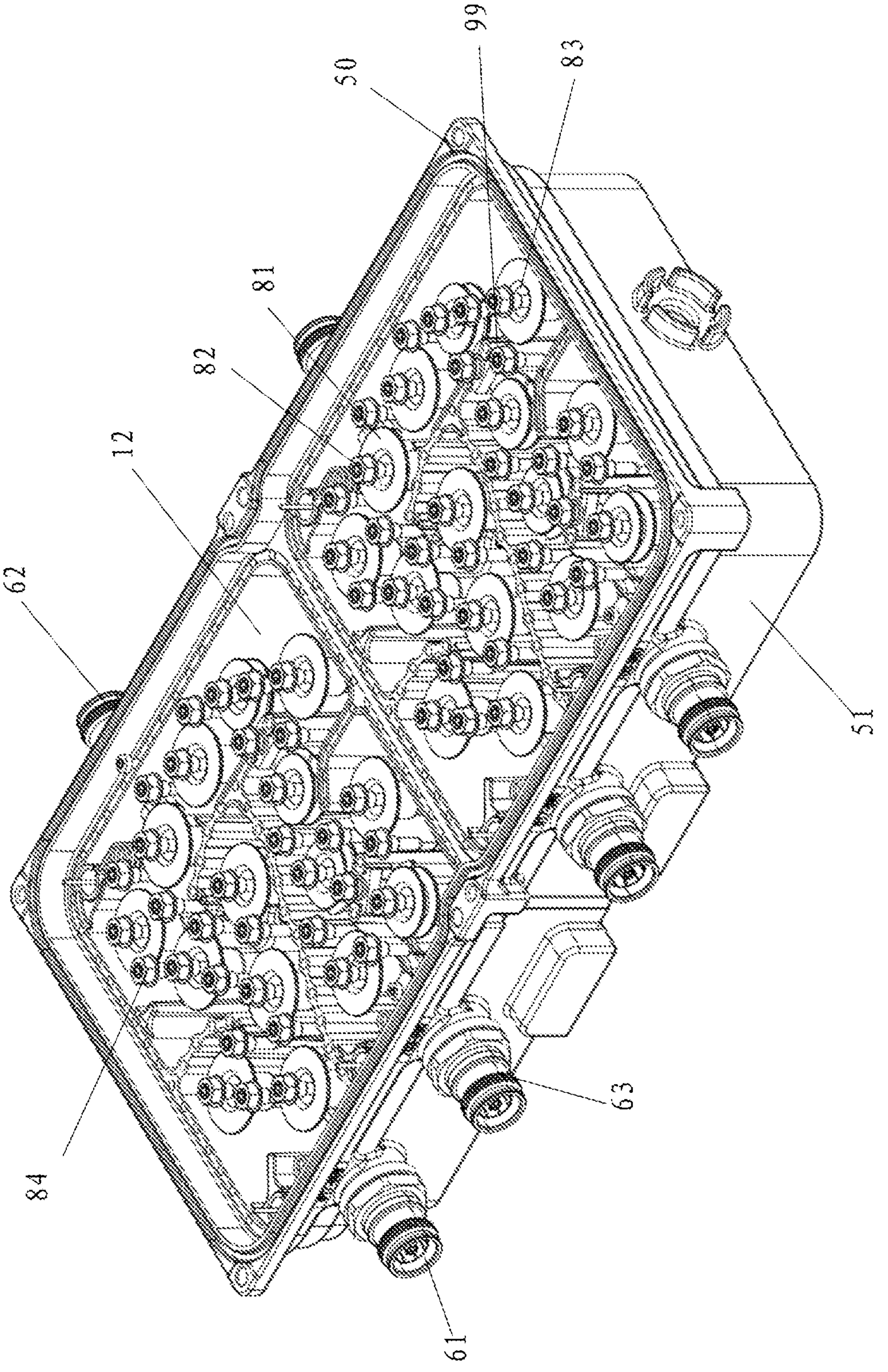
FIG. 2 is an exemplary perspective view of an RF device comprising a cavity filter according to some embodiments of the present disclosure.
Figure 3:
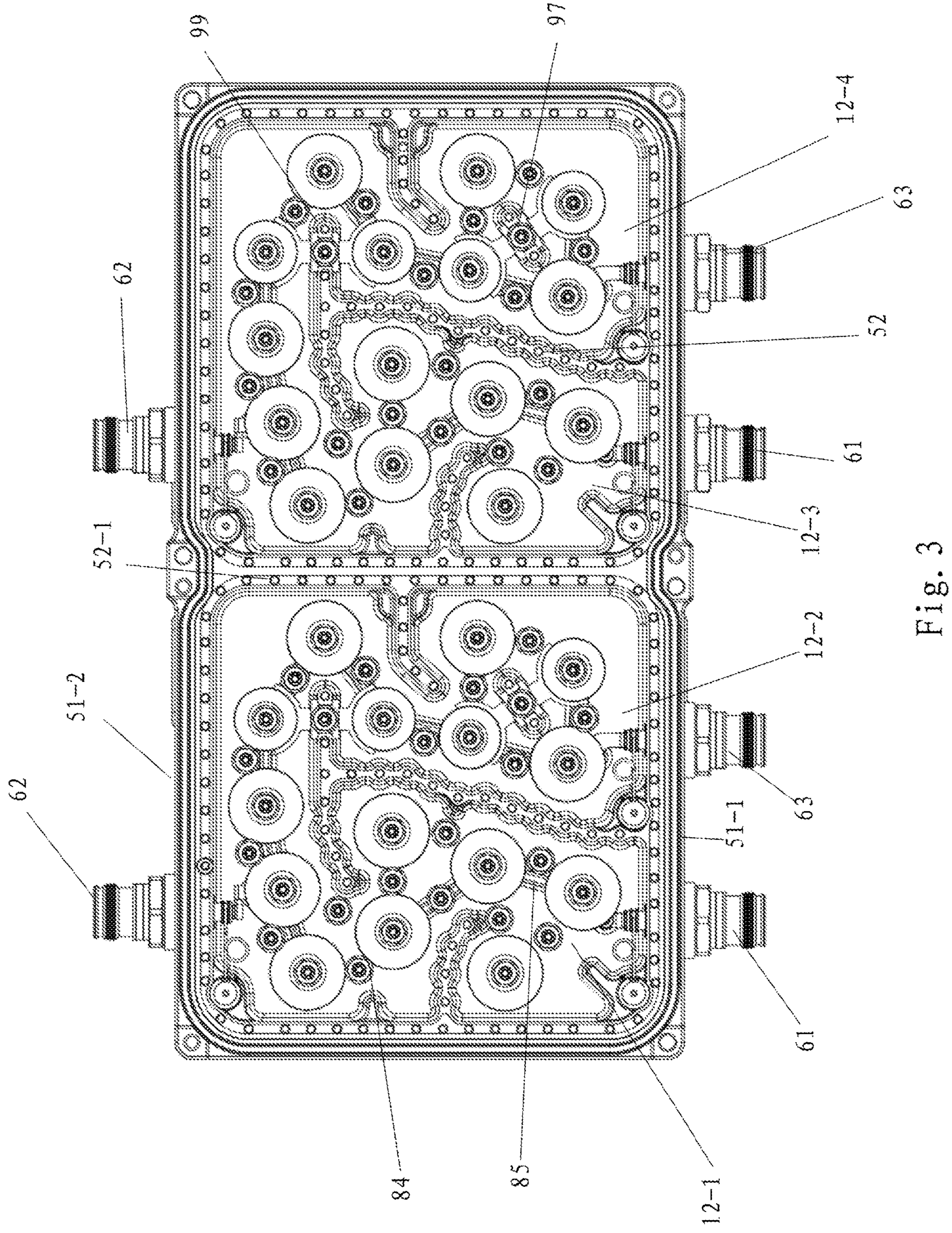
FIG. 3 is a top view of the RF device shown in FIG. 2.
Figure 4:
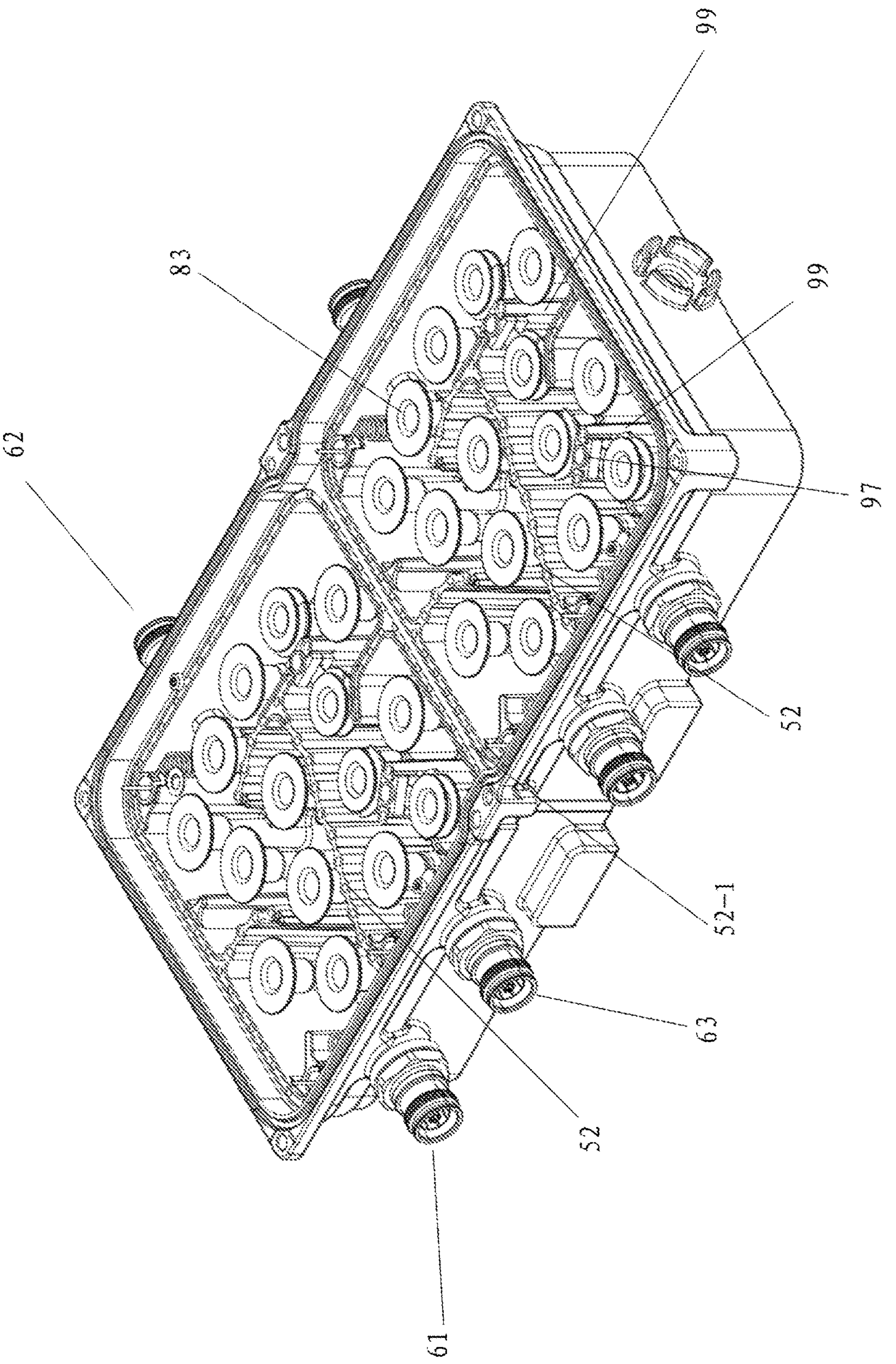
FIG. 4 is another perspective view of the RF device shown in FIG. 2, with the tuning screws removed.

Referring to FIGS. 2 through 4, the RF device 10 according to the embodiments of the present disclosure will be described. FIG. 2 is an exemplary perspective view of the RF device 10 comprising the cavity filter 12 according to some embodiments of the present disclosure with the filter covers removed, but the tuning elements that are mounted in the lower filter cover illustrated. FIG. 3 is a top view of the RF device 10 shown in FIG. 2. FIG. 4 is another perspective view of the RF device 10 shown in FIG. 2, in which the tuning screws are removed.

Referring first to FIG. 2, the RF device 10 according to some embodiments of the present disclosure may comprise a housing 50. The housing 50 may comprise one or more top covers (not shown), a bottom wall and side walls 51 that define an internal cavity. The housing 50 may further comprise partitions 52 that extend from the side walls 51 into the internal cavity and that extend upward from the bottom wall. The internal cavity is divided by the partitions 52 into a plurality of cavities that are at least partially isolated from each other by the partitions 52. The cavities are used to form the corresponding cavity filter 12, for example, a band-pass filter or a band-stop filter.

Referring to FIG. 3, the RF device 10 may comprise a plurality of signal input/output ports 61, 62, and 63 formed on the side walls 51. The first port 61 may extend through the first side wall 51-1, and the second port 62 may extend through the second side wall 51-2 opposite the first side wall 51-1. The first port 61 may be coupled to the second port 62 through the first cavity filter 12-1. The third port 63 may extend through the first side wall 51-1, and the third port 63 may be coupled to the second port 62 through the second cavity filter 12-2. The first cavity filter 12-1 and the second cavity filter 12-2 share the second port 62. When a signal is input at the second port 62, the first component of the signal within a passband of the first cavity filter 12-1 is output through the first port 61, and a second component of the signal within a passband of the second cavity filter 12-2 may be output through the third port 63. When the signals are input at the first port 61 and the third port 63, a combined signal comprising a first signal located in the passband of the first cavity filter 12-1 and a second signal located in the passband of the second cavity filter 12-2, is output through the second port 62.

As shown in FIGS. 2 and 3, portions of the ports 61, 62, 63 that extend outside the housing 50 are provided with connectors (e.g., threaded connectors, flanges, etc.) for connecting to other equipment. For example, the connectors may be implemented as coaxial connectors that mate with coaxial cables.

According to the above descriptions, the first cavity filter 12-1 and the second cavity filter 12-2 and their corresponding ports 61, 62 and 63 form a first three-port device (e.g., may be applied as a combiner/splitter, a dual-channel multiplexer/demultiplexer, diplexer), and the third cavity filter 12-3 and the fourth cavity filter 12-4 and their corresponding ports form a second three-port device. After the top covers of the housing 50 are mounted in position, the first and second three-port devices are basically isolated from each other since the middle partition 52-1 is continuously in contact with the lower top cover, so that the first and second three-port devices may each operate independently. Although the structure of the first and second three-port devices are almost identical in the embodiment shown in the figures, it will be appreciated that the two three-port devices that operate independently may have different structures and characteristics. In addition, transmission directions of signals in the first and second three-port devices may also be different.

Although the RF device 10 comprising two three-port devices (each of which may comprise two filters, for example, two band-pass filters, one band-pass filter and one band-stop filter, or two band-stop filters) is described above with reference to FIGS. 2 through 4, it will be appreciated that the RF device 10 according to other embodiments of the present disclosure may comprise only one three-port device or more than two three-port devices. Further, although an input port and an output port of each three-port device in the RF device 10 shown in FIGS. 2 through 4 are disposed on opposite side walls 51, it will be appreciated that the input port and the output port of each three-port device may be disposed on adjacent side walls 51, or on the same side wall 51.

Furthermore, although a dual-band RF device 10 including a three-port device, such as a dual-band combiner, is described above with reference to FIGS. 2 to 4. It should be understood that, in some embodiments, the RF device 10 may also be extended to multi-frequency RF devices, such as a three-band or four-band combiner, wherein the three-band combiner includes three cavity filters to form a four-port device.

The cavity filter 12 comprised in the RF device 10 will be described below with reference to FIGS. 2 through 4 again. In the embodiments shown in FIGS. 2 through 4, the first cavity filter 12-1 and the second cavity filter 12-2 may be respectively configured as band-pass filters. The passband or the operating frequency band of the first band-pass filter 12-1 may be, for example, 617-698 MHz, while the second band-pass filter 12-2 may be configured as an ultra-wide-band-band-pass filter, and the passband or operating frequency band thereof may be, for example, 703-960 MHz. It will be appreciated that the cavity filter 12 comprised in the RF device 10 may further comprise any other type of filter. It is not specifically limited herein.

As shown in FIGS. 2 and 3, each band-pass filter 12 may comprise a plurality of resonators 81 and frequency tuning elements 82 (e.g. frequency tuning screws) assigned to the corresponding resonators 81. The resonators may be formed on the bottom wall of the housing 50 and extend upward. The resonators 81 may be integrally formed on the bottom wall of the housing 50 and/or may be mounted to the bottom wall of the housing 50. The interior of each resonator 81 may comprise a cavity and each resonator have an upward opening 83. Each of the frequency tuning elements 82 may be configured to be inserted to a variable depth into the cavity formed by the corresponding resonator 81 so as to separately tune the resonant frequency of each resonator 81. In addition, each band-pass filter 12 may further comprise various types of coupling tuning elements. In some embodiments, the coupling tuning element may be the coupling tuning screw 84, which may be arranged between pairs of resonators to tune the coupling between the resonators. In some embodiments, the coupling tuning elements may be coupling metal rods 85, which may be bridged between two resonators to tune the coupling between the resonators. The frequency characteristics of the filter may be adjusted by tuning the resonant frequency of each resonator and the coupling (e.g. electrical coupling and/or magnetic coupling) between each pair of resonators. It will be appreciated that the number of resonators in the band-pass filter depends on the width of the passband of the band-pass filter and/or the width of the transition band from passband to stopband. Therefore, the band-pass filter may comprise fewer or more resonators. Accordingly, the band-pass filter may comprise fewer or more tuning elements.

In some known implementation plans, a coupling rod may be separately mounted between two resonators of the band-pass filter, where one end of the coupling rod is coupled to the unique coupling disc of the first resonator, and the other end of the coupling rod is coupled to the unique coupling disc of the second resonator. However, there are still some drawbacks to this coupling method:

First, the coupling strength between the coupling rod and the resonator is limited.

Second, in order to achieve greater coupling strength between the first resonator and the second resonator—for example, when the passband width of the bandpass filter is large and the transition band is small, high coupling strength is required for a portion between the resonators—the distance between the coupling rod and the coupling disc of the resonator must be set to be relatively small, for example, about 1 mm, but the smaller distance increases the difficulty of manufacturing and/or assembly and worsens frequency tuning precision.

Thirdly, changes in ambient temperature may also affect the coupling strength between the resonator and the coupling rod, for example, the dimension of the resonator and/or the coupling rod may change due to thermal expansion and contraction.

Figure 5:
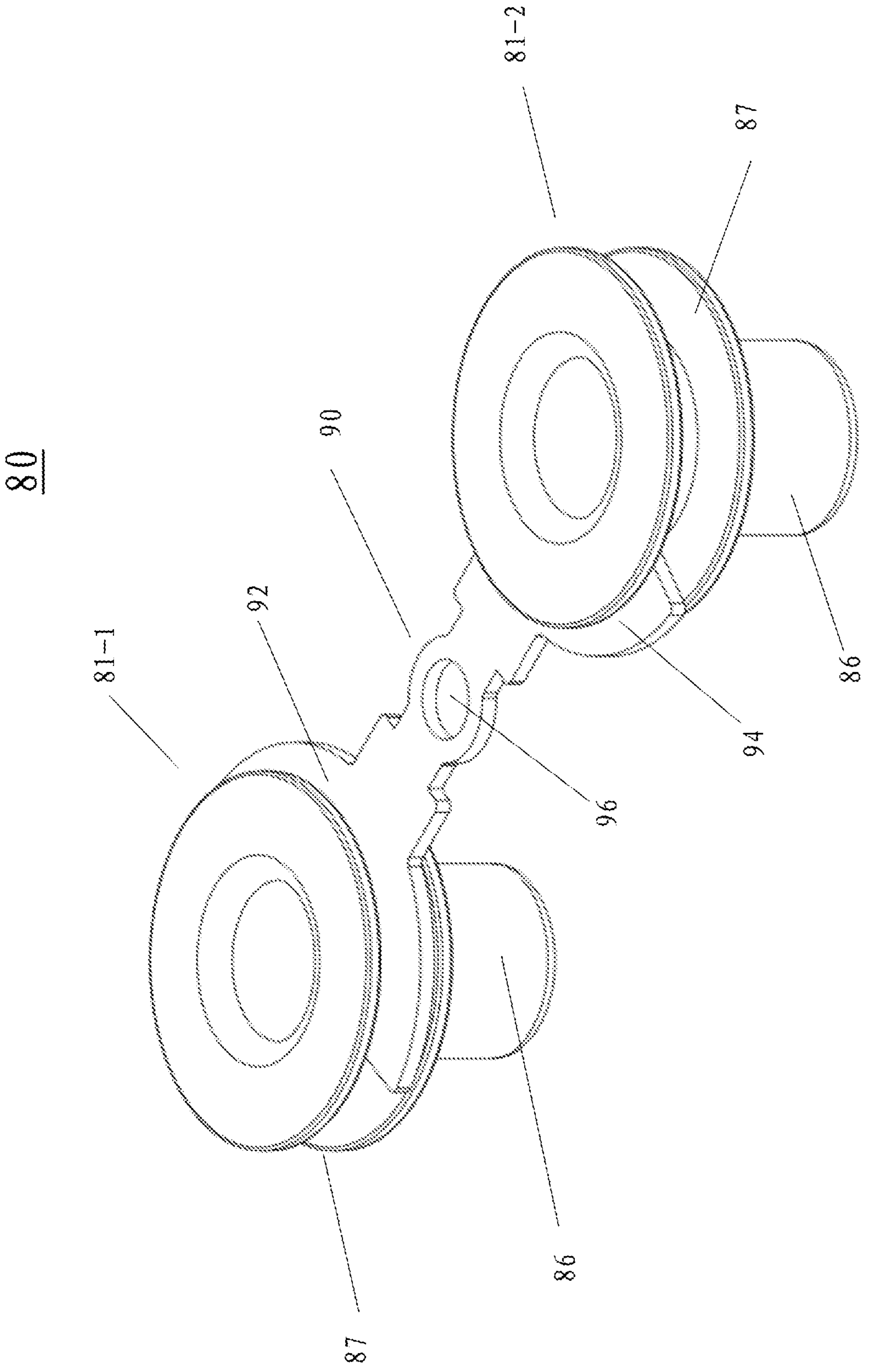
FIG. 5 is an exemplary perspective view of a resonator assembly in the RF device shown in FIG. 2, the resonator assembly comprises two resonators and a metal coupling sheet located between the two resonators.
Figure 6:
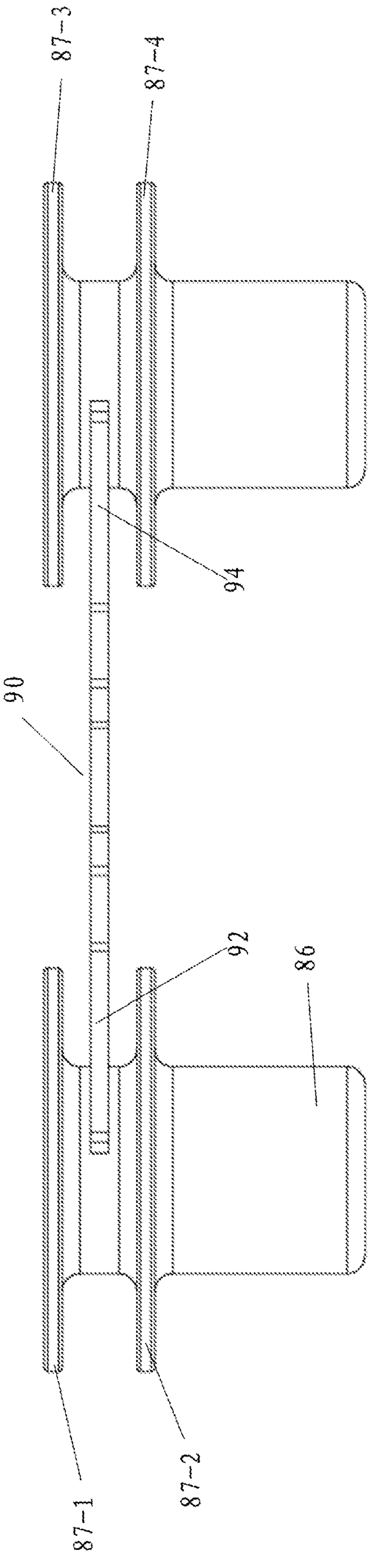
FIG. 6 is a side view of the resonator assembly shown in FIG. 5.
Figure 7:
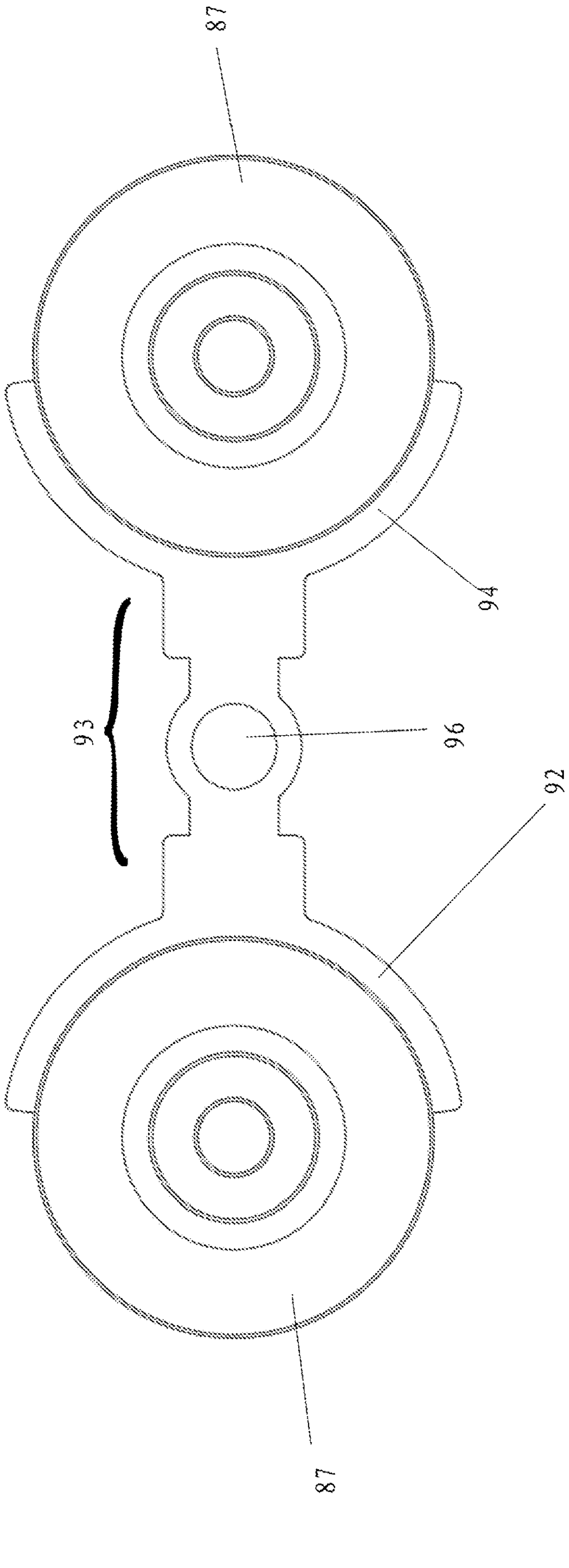
FIG. 7 is a top view of the resonator assembly shown in FIG. 5.

In order to avoid one or a plurality of the above drawbacks, the present disclosure proposes a new coupling scheme. Next, referring to FIGS. 5 to 7, a resonator assembly 80 according to some embodiments of the present disclosure will be described in detail. FIG. 5 is an exemplary perspective view of the resonator assembly 80. FIG. 6 is a side view of the resonator assembly 80 shown in FIG. 5. FIG. 7 is a top view of the resonator assembly 80 shown in FIG. 5.

First, it will be appreciated that the resonator assembly 80 according to some embodiments of the present disclosure may be disposed in various types of filters. In some embodiments, the resonator assembly 80 disclosure may be disposed in a band-pass filter. In some embodiments, the resonator assembly 80 may be disposed in a band-stop filter.

In the embodiments shown in FIGS. 2 through 4, the resonator assembly 80 only relates to a portion of the resonator in a portion of the filter. As the bandwidth of the second band-pass filter 12-2 is large and the transition band is small, based on these indicators, the coupling strength and tuning precision between some resonators in the second band-pass filter 12-2 are required to be large and high, respectively. Therefore, as shown in FIG. 2, the resonator assembly 80 according to some embodiments of the present disclosure is only disposed in the second band-pass filter 12-2, and only relates to a portion of the resonator 81 in the second band-pass filter 12-2.

Referring to FIGS. 5 and 6, the resonator assembly 80 may comprise a first resonator 81-1, a second resonator 81-2, and a metal coupling sheet 90 between the two resonators. Each of the resonators 81-1 and 81-2 may be designed as a coaxial resonator, and the longitudinal axis of the resonator is basically perpendicular to the bottom wall of the housing 50. The metal coupling sheet 90 may be configured in a flat shape and the plane in which it is located is basically parallel to the bottom wall of the housing 50.

Each of the resonators 81-1 and 81-2 in the resonator assembly 80 may comprise: a body portion 86 that extends forward from the bottom wall of the housing 50 and two coupling panels 87 or coupling flanges that protrude outward from the corresponding body portion 86 and are spaced apart from each other. Each coupling panel 87 may be separately configured to be basically parallel to the bottom wall of the housing 50. A first coupling panel 87-1 may be formed at the peripheral edge at the top of the body portion 86 of the first resonator 81-1 (the top of the body portion 86 has an opening for the frequency tuning element to extend into), and a second coupling panel 87-2 may be formed a certain distance from the rear of the first coupling panel 87-1, for example, the spacing between the second coupling panel 87-2 and the first coupling panel 87-1 may be set to a range of several millimeters. A third coupling panel 87-3 may be formed at the peripheral edge at the top of the body portion 86 of the second resonator 81-2 (the top of the body portion 86 has an opening for the frequency tuning element to extend into), and a fourth coupling panel 87-4 may be formed a certain distance from the rear of the third coupling panel 87-3, for example, the spacing between the fourth coupling panel 87-4 and the third coupling panel 87-3 may be set to a range of several millimeters.

In order to establish the desired electrical coupling between the first resonator 81-1 and the second resonator 81-2, the metal coupling sheet 90 may have a first coupling section 92 positioned between the first coupling panel 87-1 and the second coupling panel 87-2 and a second coupling section 94 positioned between the third coupling panel 87-3 and the fourth coupling panel 87-4. The metal coupling sheet 90 is configured to not be in direct contact with the first resonator 81-1 and the second resonator 81-2, but to establish electrical coupling between the first resonator 81-1 and the second resonator 81-2 through capacitive coupling. Specifically, a first coupling capacitance is formed between the first coupling section 92 of the metal coupling sheet 90 and the first coupling panel 87-1 of the first resonator 81-1 and a second coupling capacitance is formed between the first coupling section 92 of the metal coupling sheet 90 and the second coupling panel 87-2 of the first resonator 81-1. A third coupling capacitance is formed between the second coupling section 94 of the metal coupling sheet 90 and the third coupling panel 87-3 of the second resonator 81-2, and a fourth coupling capacitance is formed between the second coupling section 94 of the metal coupling sheet 90 and the fourth coupling panel 87-4 of the second resonator 81-2.

Based on the principle of plate capacitor, the capacitance of the plate capacitor is directly proportional to the overlapping area of the plates and inversely proportional to the distance between the plate. Therefore, the first coupling capacitance is directly proportional to the facing area between the first coupling section 92 and the first coupling panel 87-1 and inversely proportional to the distance between the first coupling section 92 and the first coupling panel 87-1. The second coupling capacitance is directly proportional to the facing area between the first coupling section 92 and the second coupling panel 87-2 and inversely proportional to the distance between the first coupling section 92 and the second coupling panel 87-2. The third coupling capacitance is directly proportional to the facing area between the second coupling section 94 and the third coupling panel 87-3 and inversely proportional to the distance between the second coupling section 94 and the third coupling panel 87-3. The fourth coupling capacitance is directly proportional to the facing area between the second coupling section 94 and the fourth coupling panel 87-4 and inversely proportional to the distance between the second coupling section 94 and the fourth coupling panel 87-4.

Since the first coupling section 92 of the metal coupling sheet 90 is located between (for example, in the middle of) the first coupling panel 87-1 and the second coupling panel 87-2, and the second coupling section 94 of the metal coupling sheet 90 is located between (for example, in the middle of) the third coupling panel 87-3 and the fourth coupling panel 87-4, the first capacitance and the second capacitance may be configured to achieve mutual compensation, and the third capacitance and the fourth capacitance may be configured to achieve mutual compensation.

As an example, when the first coupling section 92 is undesirably biased upward due to the effects of manufacturing error, assembly error and/or temperature, the distance between the first coupling section 92 and the first coupling panel 87-1 becomes smaller, making the first capacitance larger, and the distance between the first coupling section 92 and the second coupling panel 87-2 becomes larger, making the second capacitance smaller. Thus, the electrical coupling between the metal coupling sheet 90 and the first resonator 81-1 is capable of self-adjustment, which effectively improves the robustness and stability of the cavity filter 12.

As an example, when the second coupling section 94 is undesirably biased downward due to the effects of manufacturing error, assembly error and/or temperature, the distance between the second coupling section 94 and the third coupling panel 87-3 becomes larger, making the first capacitance smaller, and the distance between the second coupling section 94 and the fourth coupling panel 87-4 becomes smaller, making the second capacitance larger. Thus, the electrical coupling between the metal coupling sheet 90 and the second resonator 81-2 is capable of self-adjustment, which effectively improves the robustness and stability of the cavity filter 12.

In addition, the flat metal coupling sheet 90 helps to expand the overlapping area between each coupling panel 87 and the corresponding coupling section, thereby increasing the facing area between the metal coupling sheet 90 and the corresponding coupling panel 87, thereby increasing coupling capacitance. In some embodiments, in order to achieve substantially the same coupling capacitance as the traditional design with only a single coupling panel, the distance between the two coupling panels 87 can be increased, for example, be increased by at least 20%. %, 30%, 50% or even 60% or 100%, thereby reducing the size sensitivity of the cavity filter and effectively improving the robustness and stability of the cavity filter.

As shown in FIGS. 5 and 7, the first coupling section 92 is configured to at least partially surround the body portion 86 of the first resonator 81-1, and the second coupling section 94 is configured to at least partially surround the body portion 86 of the second resonator 81-2. The corresponding coupling section of the metal coupling sheet 90 may surround the body portion 86 of the corresponding resonator at a certain angle that is basically parallel to the bottom wall of the housing 50.

In the illustrated embodiment, the corresponding coupling section may be configured as a portion of the coupling loop. In other words, the corresponding coupling section may be configured to surround the body portion of the corresponding resonator by more than 60 degrees, 90 degrees, 120 degrees, 180 degrees or even 270 degrees.

In other embodiments, the corresponding coupling section may be configured as a complete coupling loop, i.e., the corresponding coupling section may be configured to encircle the body portion of the corresponding resonator.

Continuing to refer to FIGS. 5 and 7, the corresponding coupling panel 87 of the resonator may surround the body portion 86 of the resonator at a certain angle that is basically parallel to the bottom wall of the housing 50. In other words, each coupling panel 87 may be configured to be at least a partially annular coupling disc.

In the illustrated embodiment, the corresponding coupling panel 87 may be configured to be a complete coupling disc, i.e., the corresponding coupling panel 87 may be configured to encircle the body portion 86 of the resonator.

Figure 11:
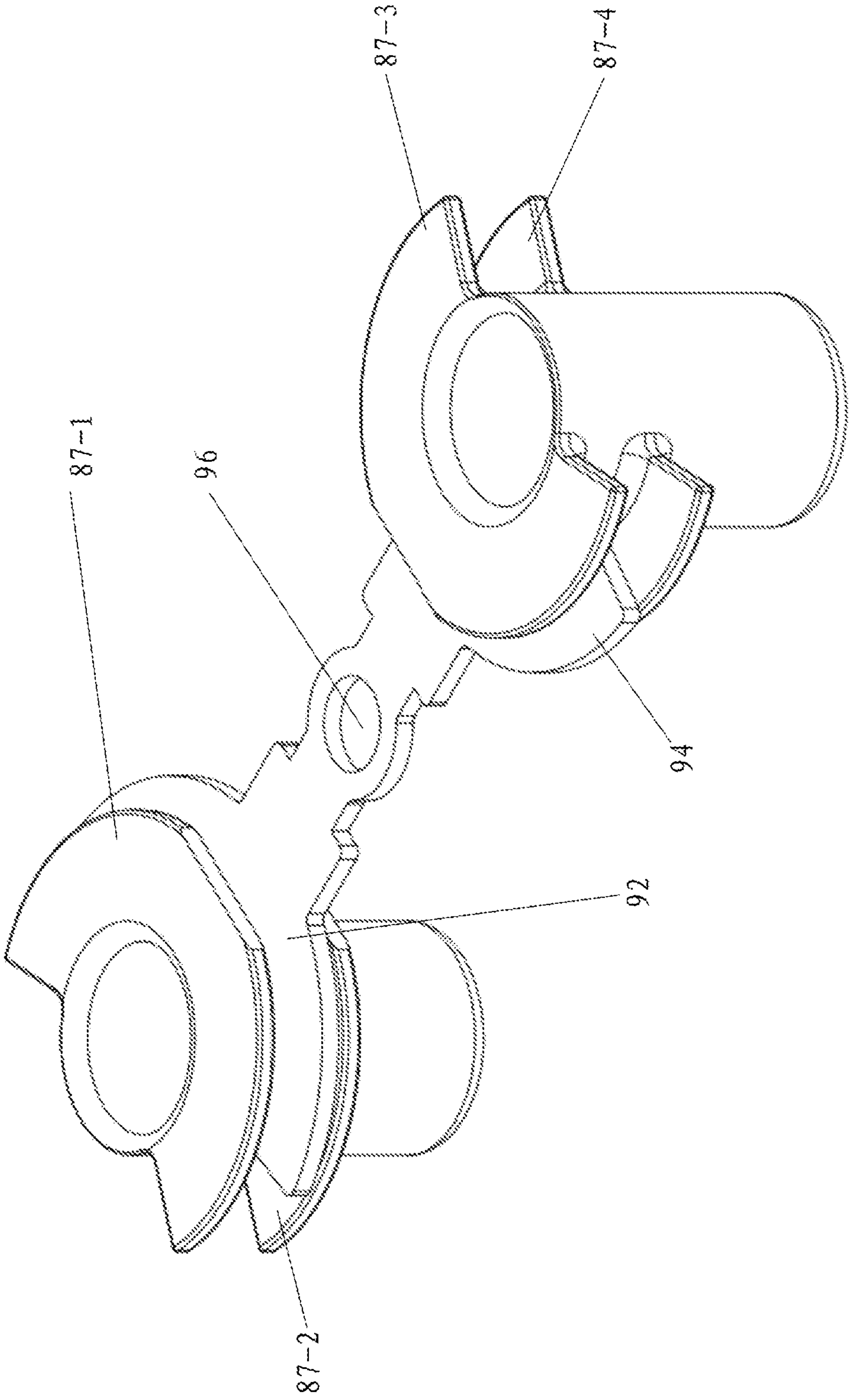
FIG. 11 is an exemplary perspective view of a resonator assembly according to some other embodiments of the present disclosure.
Figure 12:
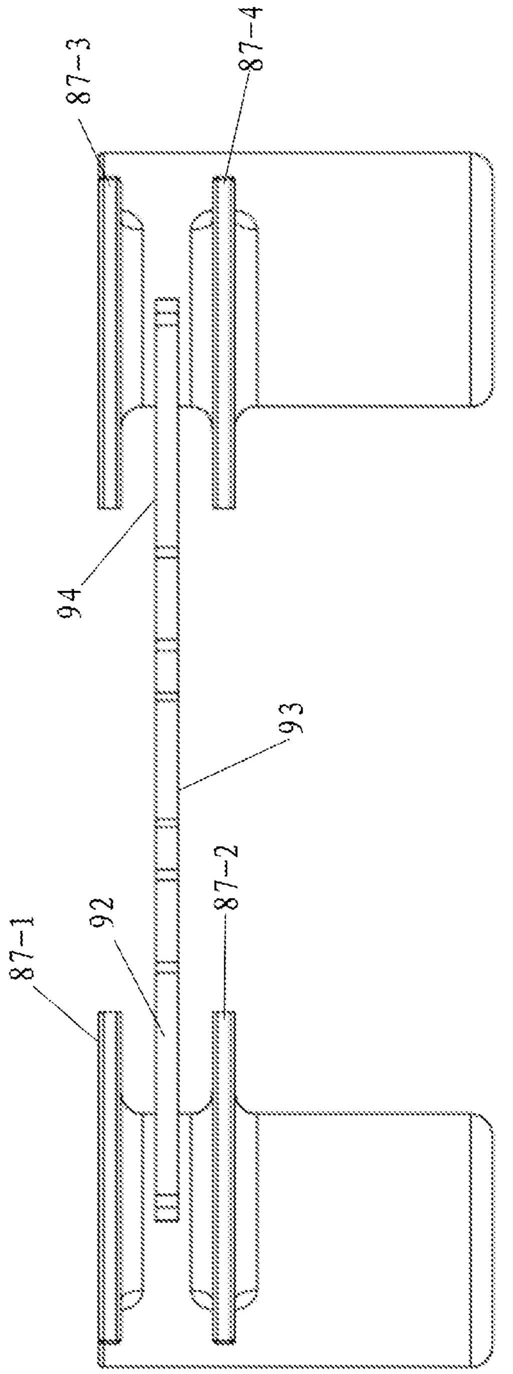
FIG. 12 is a side view of the resonator assembly shown in FIG. 11.
Figure 13:
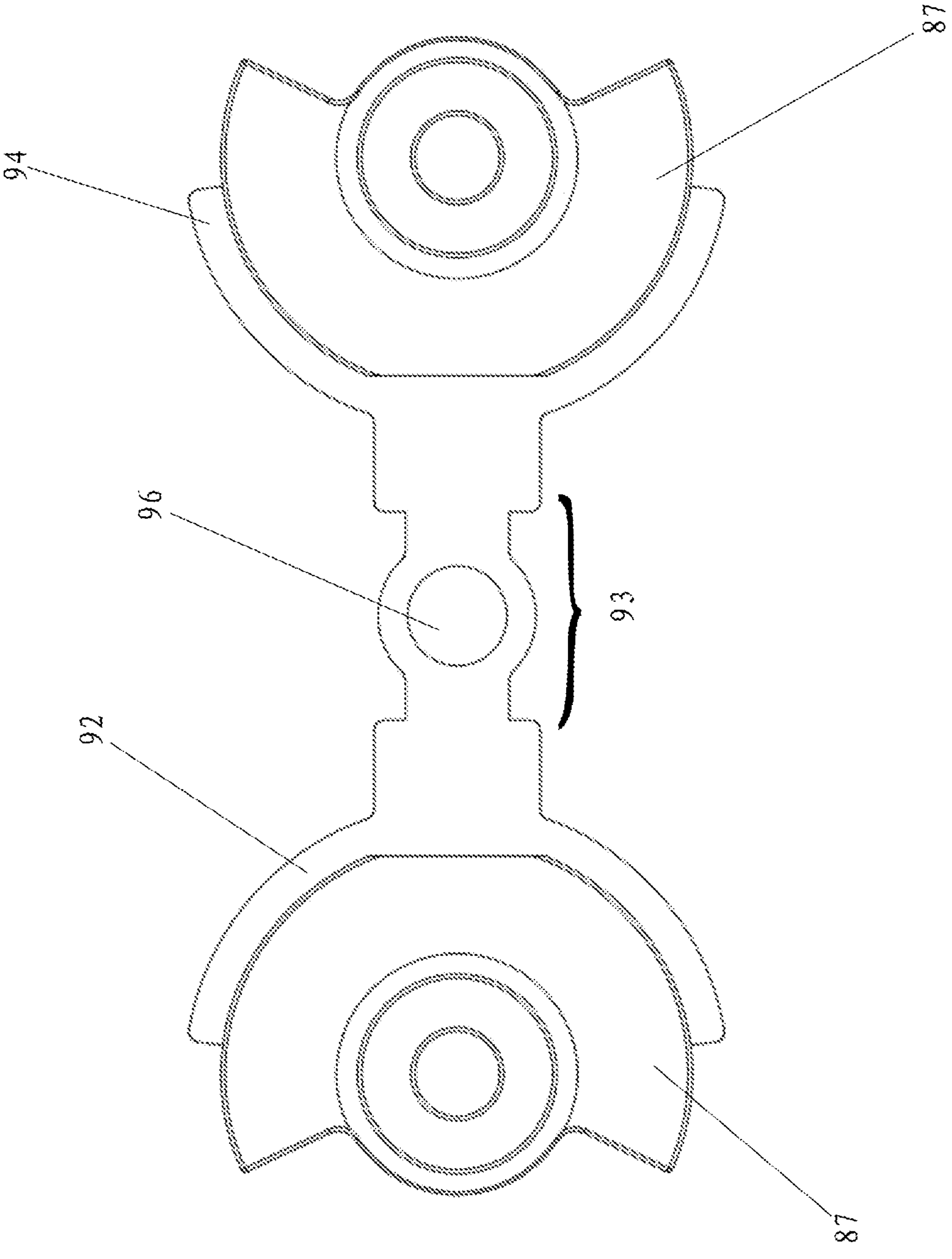
FIG. 13 is a top view of the resonator assembly shown in FIG. 11.

In other embodiments, as shown in FIGS. 11 through 13, an exemplary perspective view, side view and top view of the resonator assembly 80 according to other embodiments of the present disclosure are shown. Referring to FIGS. 11 through 13, the corresponding coupling panel 87 may be configured to be a partially annular coupling disc, that is, a fan-shaped coupling disc, i.e., the corresponding coupling panel 87 may be configured to surround the resonator by more than 60 degrees, 90 degrees, 120 degrees, 180 degrees or even 270 degrees.

It will be appreciated that the metal coupling sheet 90 and/or coupling panel 87 may also be of other shapes. For example, elliptical annulus, triangle, rectangle, or other polygons.

Additionally, or alternatively, in some embodiments of the present disclosure, a means for actively tuning the electrical coupling between the first resonator 81-1 and the second resonator 81-2 is further provided. As shown in FIGS. 5 and 7, the metal coupling sheet 90 may comprise a connecting section 93 connected between the first coupling section 92 and the second coupling section 94, and through-holes 96 for tuning elements, for example, tuning screws, are provided thereon, so as to achieve active tuning of the electrical coupling between the first resonator 81-1 and the second resonator 81-2.

Figure 8:
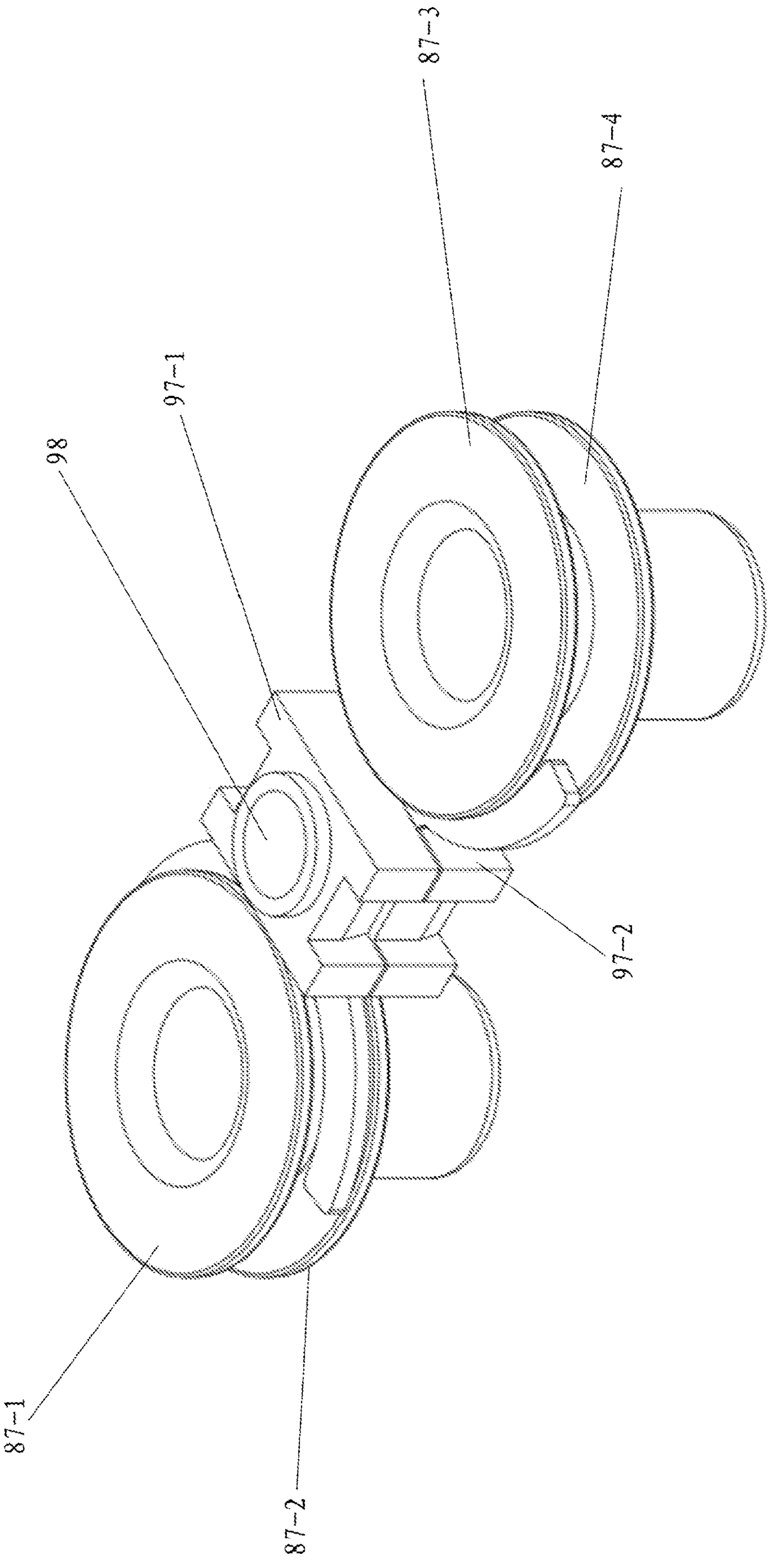
FIG. 8 is another perspective view of the resonator assembly shown in FIG. 5, the resonator assembly comprises two resonators, a metal coupling sheet located between the two resonators, and dielectric blocks.
Figure 9:
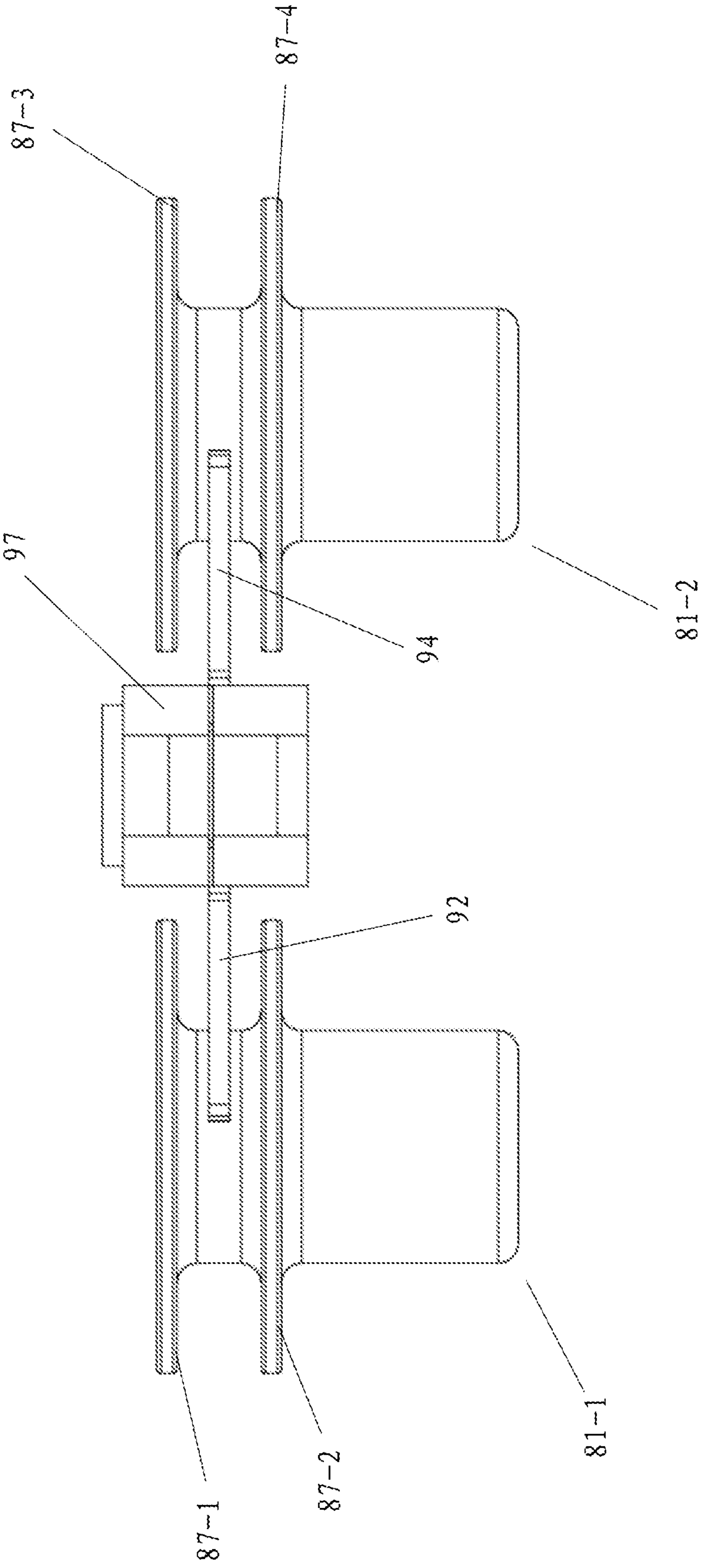
FIG. 9 is a side view of the resonator assembly shown in FIG. 8.
Figure 10:
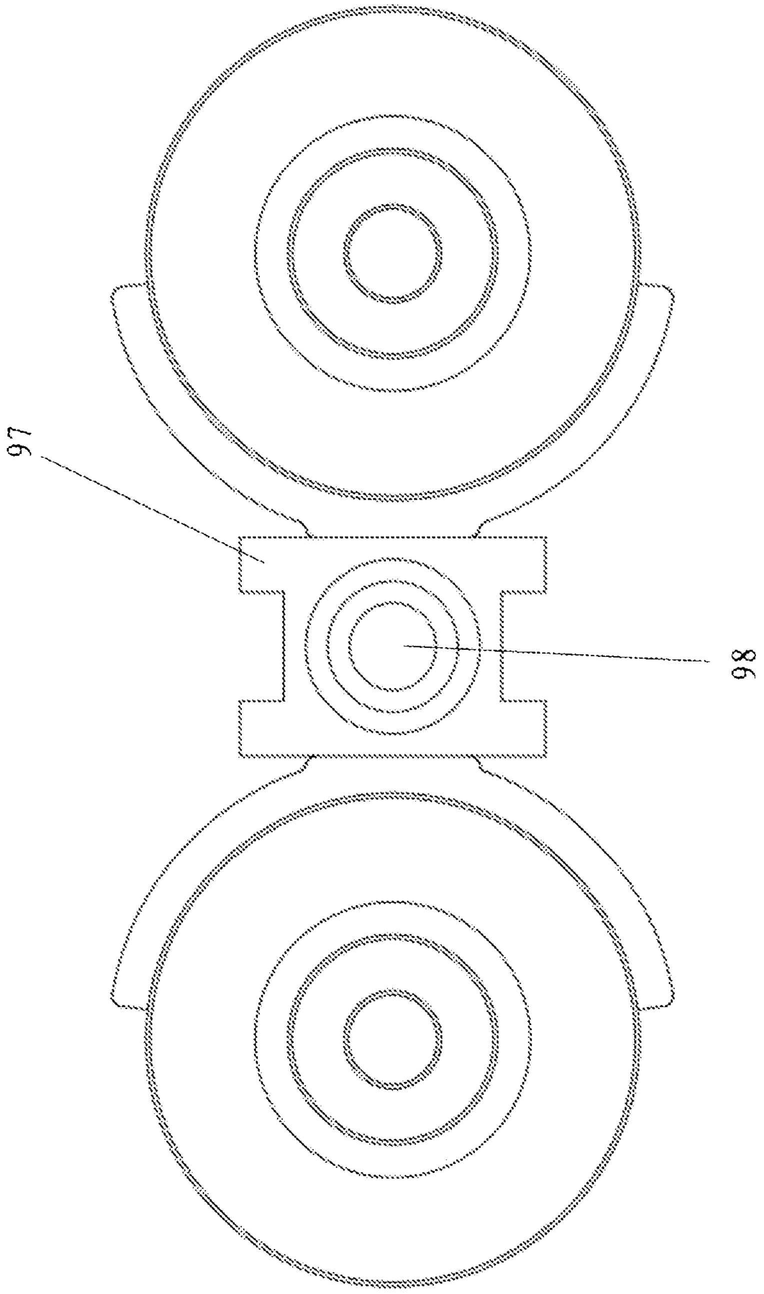
FIG. 10 is a top view of the resonator assembly shown in FIG. 8.

Next, referring to FIGS. 8 through 10 and FIGS. 2 through 4, the mounting method of the metal coupling sheet 90 will be described in further detail. In order to mount the metal coupling sheet 90, the resonator assembly 80 may comprise dielectric blocks, for example, Teflon dielectric blocks, and the metal coupling sheet 90 is supported on the dielectric blocks 97. In the illustrated embodiment, the resonator assembly 80 may comprise the first dielectric block 97-1 and the second dielectric block 97-2 and the metal coupling sheet 90 is supported between the first and second dielectric blocks. Dielectric supports 99 (refer to FIGS. 2 and 3) that extend forward from the bottom wall of the housing 50 are mounted on the bottom wall of the housing 50 for supporting the corresponding dielectric blocks. The dielectric supports 99 are capable of fastening the dielectric blocks by means of any feasible fastening methods, such as shape fitting, threaded connection, bonding, etc. In some cases, the dielectric supports 99 may also be replaced by partitions 52. In addition, as shown in FIG. 8, the corresponding dielectric blocks may have a channel 98 for the tuning elements, and the channel of the dielectric blocks may be aligned with the through-holes of the connecting section 93, thereby allowing the tuning elements to extend near or through the channel to the through-holes 96 on the connecting section 93 of the metal coupling sheet 90.

In the above embodiment, the resonator in the band-pass filter according to the embodiment of the present disclosure has a circular (or annular) cross-section. It will be appreciated that the present disclosure does not limit the shape of the resonator, and it may be designed according to actual needs.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

That which is claimed is:

1. A cavity filter, comprising:

a housing, which defines an internal cavity;

a first resonator disposed in the internal cavity, where the first resonator has a first coupling panel at an upper edge of the first resonator and a second coupling panel spaced apart from the first coupling panel;

a second resonator disposed in the internal cavity, where the second resonator has a third coupling panel at an upper edge of the second resonator and a fourth coupling panel spaced apart from the third coupling panel;

a metal coupling sheet, which has a first coupling section positioned about midway between the first coupling panel and the second coupling panel and a second coupling section positioned about midway between the third coupling panel and the fourth coupling panel.

2. The cavity filter according to claim 1, wherein the metal coupling sheet comprises a connecting section connected between the first coupling section and the second coupling section.

3. The cavity filter according to claim 1, wherein the first resonator and the second resonator have a body portion that extends forward from a bottom wall of the housing, and each coupling panel is separately configured as a flange that protrudes outward from the corresponding body portion.

4. The cavity filter according to claim 3, wherein each coupling panel has a surface opposite to the corresponding coupling section of the metal coupling sheet, so that each coupling panel and the corresponding coupling section at least partially overlap in a plane projection parallel to the bottom wall of the housing.

5. The cavity filter according to claim 1, wherein each coupling panel is separately configured to be basically parallel to a bottom wall of the housing.

6. The cavity filter according to claim 1, wherein each coupling panel is separately configured to be at least a partially annular coupling disc.

7. The cavity filter according to claim 1, wherein the first coupling section is positioned in a middle of the first coupling panel and the second coupling panel, and the second coupling section is positioned in a middle of the third coupling panel and the fourth coupling panel.

8. The cavity filter according to claim 3, wherein the first coupling section is configured to at least partially surround the body portion of the first resonator, and the second coupling section is configured to at least partially surround the body portion of the second resonator.

9. The cavity filter according to claim 8, wherein the first coupling section is configured to surround the body portion of the first resonator by more than 60 degrees, and the second coupling section is configured to surround the body portion of the second resonator by more than 60 degrees.

10. The cavity filter according to claim 1, wherein the metal coupling sheet is configured to not directly be in contact with the first resonator and the second resonator.

11. The cavity filter according to claim 2, wherein a through-hole for a tuning elements is provided on the connecting section of the metal coupling sheet.

12. A cavity filter, comprising:

a housing, which defines an internal cavity;

a first resonator disposed in the internal cavity, where the first resonator has a first coupling panel and a second coupling panel spaced apart from the first coupling panel;

a second resonator disposed in the internal cavity, where the second resonator has a third coupling panel and a fourth coupling panel spaced apart from the third coupling panel;

a metal coupling sheet, which has a first coupling section positioned between the first coupling panel and the second coupling panel and a second coupling section positioned between the third coupling panel and the fourth coupling panel, wherein the metal coupling sheet comprises a connecting section connected between the first coupling section and the second coupling section, wherein a through-hole for a tuning elements is provided on the connecting section of the metal coupling sheet, and wherein the cavity filter comprises dielectric blocks, and the metal coupling sheet is supported on the dielectric blocks.

13. The cavity filter according to claim 12, wherein the cavity filter further comprises at least one partition extending upward from a bottom wall of the housing, and the at least one partition is configured to divide the internal cavity into a plurality of cavities that are at least partially isolated from each other, wherein the dielectric blocks are supported on the at least one partition.

14. A cavity filter, comprising:

a housing, which defines an internal cavity;

a first resonator disposed in the internal cavity;

a second resonator disposed in the internal cavity;

a metal coupling sheet, which comprises a first coupling section for coupling with the first resonator and a second coupling section for coupling with the second resonator, in which, the first coupling section and the first resonator form a first capacitance and a second capacitance, and the second coupling section and the second resonator form a third capacitance and a fourth capacitance, wherein the first capacitance and the second capacitance are configured to achieve mutual compensation, and wherein the third capacitance and the fourth capacitance are configured to achieve mutual compensation.

15. The cavity filter according to claim 14, wherein the first resonator has a first coupling panel and a second coupling panel spaced apart from the first coupling panel, and the second resonator has a third coupling panel and a fourth coupling panel spaced apart from the third coupling panel.

16. The cavity filter according to claim 14, wherein the metal coupling sheet comprises a connecting section connected between the first coupling section and the second coupling section.

17. The cavity filter according to claim 16, wherein a through-hole for a tuning element is provided on the connecting section of the metal coupling sheet.

18. The cavity filter according to claim 17, wherein the cavity filter comprises dielectric blocks, and the metal coupling sheet is supported on the dielectric blocks.

19. The cavity filter according to claim 18, wherein the dielectric blocks have a channel for the tuning element, and the channel of the dielectric blocks is aligned with the through-hole of the connecting section, allowing the tuning element to pass therethrough.

20. A cavity filter, comprising:

a housing, which defines an internal cavity;

a first resonator disposed in the internal cavity, where the first resonator has a first coupling panel and a second coupling panel spaced apart from the first coupling panel;

a second resonator disposed in the internal cavity, where the second resonator has a third coupling panel and a fourth coupling panel spaced apart from the third coupling panel;

a metal coupling sheet, which has a first coupling section positioned between the first coupling panel and the second coupling panel and a second coupling section positioned between the third coupling panel and the fourth coupling panel, wherein each of the first through fourth coupling panels comprises a flat surface that is parallel to a bottom surface of the housing.

* * * * *